United States Patent Office 2,722,825
Patented Nov. 8, 1955

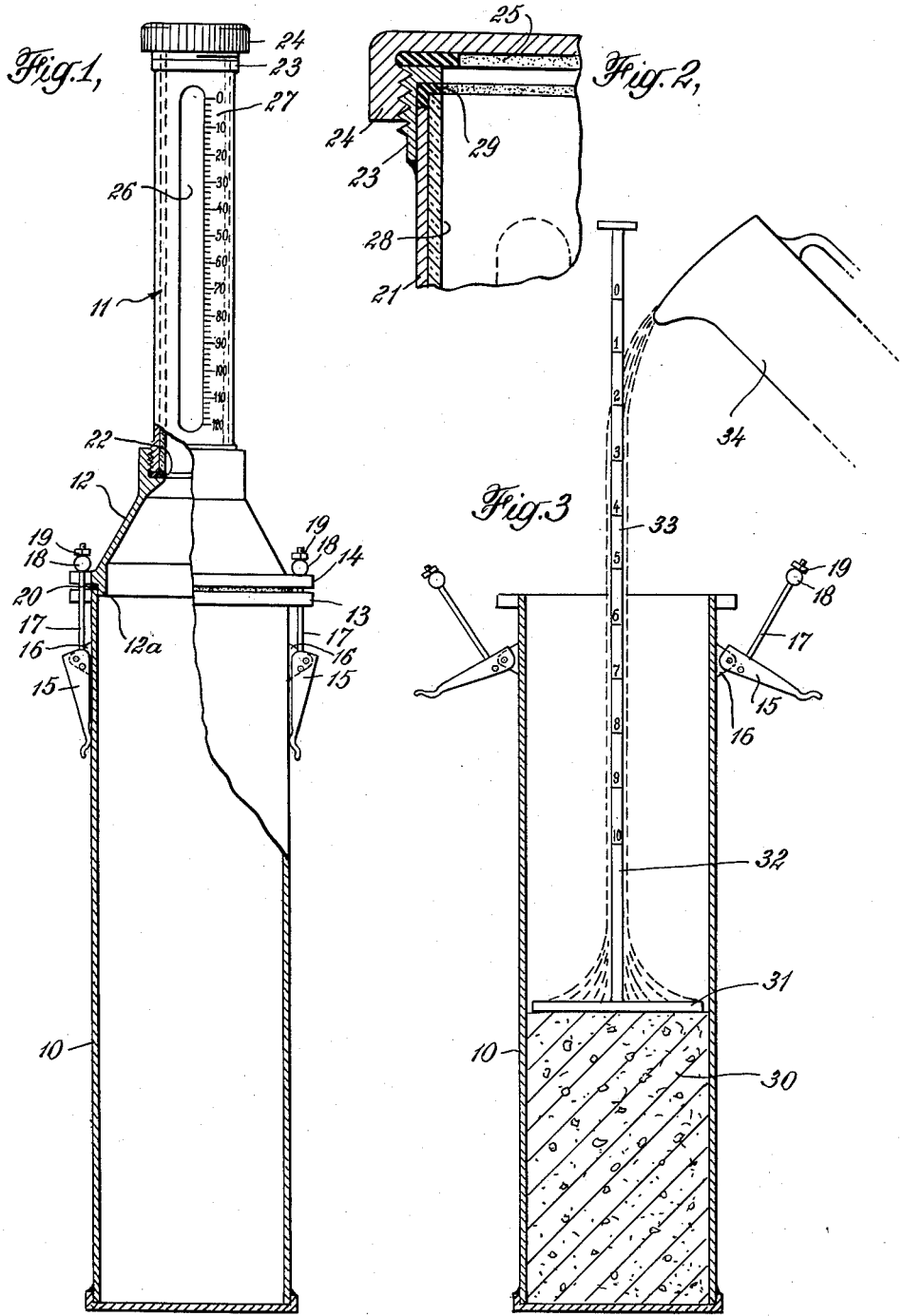

2,722,825

APPARATUS FOR MEASURING THE AMOUNT OF AIR ENTRAINED IN PLASTIC MIXTURES

Erik Victor Meyer, Holte, Denmark, assignor to F. L. Smidth & Co., New York, N. Y., a corporation of New Jersey Application November 21, 1952, Serial No. 321,899

2 Claims. (Cl. 73—19)

This invention relates to the determination of the air content of plastic concrete and like materials and is concerned more particularly with a novel apparatus for the purpose.

Concrete made of air-entrained cements is now widely used, for example, for structures made by pouring the plastic concrete into forms, since such concrete fills the forms evenly and sets with smooth surfaces. The amount of air in such concrete must be kept within limits and it is, accordingly, common practice to make periodic determinations of the air content in samples of the plastic material.

In the methods heretofore used for such determinations of entrained air content, the amount of entrained air is ascertained either by noting the contraction of a sample when subjected to a known pressure or else the air in the sample is displaced by water and then measured. The apparatus used in the pressure method is expensive and correction must be made for air contained in the particles of aggregate, since such air is measured but is not considered to be entrained air. Also inaccuracies in measurement arise in the pressure method from bridging or arching within the sample and, in the displacement method, because of failure to displace the air completely by the water. In the prior methods, it is necessary either that the sample be weighed or that a calibrated container be filled with the sample to an exact level. For these reasons, the determination of the air content by the use of such methods and apparatus is somewhat laborious and cannot readily be carried out at building sites and similar locations, where rapid determination as a routine procedure is important.

The present invention is, accordingly, directed to the provision of an apparatus for determining the air content in plastic concrete, which is quicker and simpler than such apparatus heretofore in use, which can be utilized at any location, can be operated by a person without special skill and with little training, and can be so constructed that the calculations required are kept to a minimum.

For a better understanding of the invention, reference may be made to the accompanying drawing, in which Fig. 1 is a view, partly in elevation and partly in vertical section, of the apparatus:

Fig. 2 is a fragmentary vertical sectional view of the apparatus on an enlarged scale; and Fig. 3 is a view, partly in vertical section and partly in elevation, showing one step in the use of the apparatus.

The apparatus illustrated comprises a container 10, which is of uniform cross-section from end to end and is preferably cylindrical in form. The container is provided with a neck 11, which is of uniform cross-section from end to end and is attached to a conical section 12 capable of being mounted on the upper end of the container and readily detached therefrom. For this purpose, the container is provided at its upper end with a flange 13 having slots, which may be aligned with similar slots in a flange 14 at the lower end of the conical section. A number of arms 15 are pivoted on brackets 16 on the container wall below flange 13 and each arm has pivoted thereon a rod 17 carrying an enlargement 18, which may take the form of a ball threaded on the rod and held in place by a nut 19. When the neck is to be mounted on the container, a gasket 20 is placed on the upper end of the container and the large end of the conical section 12 is seated on the gasket, the lower edge 12a of the section telescoping into the container in this operation. The arms 15 are swung up, so that the rods 17 pass through the aligned slots in flanges 13 and 14 and the balls 18 overlie flange 14. When the rods 15 are now swung down against the side of the container, the balls 18 engage flange 14 and cause the conical section to clamp the gasket tightly.

The neck 11 comprises a tube 21, which is threaded into the small end of the conical section and seated on a gasket 22. At its upper end, the tube 21 is provided with a sleeve 23 secured permanently to the tube and provided with external threads for engagement with a cap 24. The cap contains a liner 25 engageable with the top of sleeve 23, so that the cap may close the neck tightly and prevent leakage. The tube 21 is provided with a longitudinal slot 26 extending nearly the full length of the tube and also with a scale 27 along one side of the slot, the scale is calibrated in volumetric increments of the container, with the zero point of the scale being at the top. A transparent tube 28, which may be of glass, serves as a liner for tube 21 and the liner tube is seated at its lower end on the gasket 22 and at its upper end on a gasket 29 within an internal flange on the sleeve 23.

In the use of the apparatus for the determination of the air content of plastic concrete, the assembly made up of the conical section 12 and neck 11 is removed from the container and a quantity of concrete 30 is introduced into the bottom of the container. The top of the concrete mass is next leveled off by means of a disc 31 on the end of a rod 32, which is provided with a scale 33, the zero point of the scale being near the top of the rod. The height of the sample is now determined by sighting along the top edge of the container and reading the scale on the rod. While the rod is in place, the container is filled with water, which may be poured from a vessel 34 along the rod, so that the water will run down the rod and fall upon the top of the disc 31. The disc is only slightly smaller in diameter than the interior of the container and the introduction of the water along the rod prevents the sample from being disturbed by the water. When the container is nearly full, the rod is removed and the conical section and neck assembly is applied and locked in place. Additional water together with a small amount of a foam-destroying agent is now introduced through the open end of the neck, until the level of the water is in line with the zero point on the scale 27, after which the cap 24 is screwed tightly on the end of the neck.

The closed container is now agitated by shaking and, for this purpose, the neck of the container is held in one hand and the base in the other. In the initial part of the shaking operation, the container is held with its long axis horizontal and the shaking is continued, until the concrete is thoroughly loosened up. As the container is of relatively small diameter, for example, 11 cm., the entrained air has only a short distance to travel to be free of the concrete and this is advantageous. After the concrete is loose, the container is turned to upright position slowly, so as to avoid the trapping of the air by the sample, and the shaking continued, until the container is upright. The water level in the neck is again read frm scale 27 and is lower than the original one, the difference between the two water levels being a measure of the amount of air, which was present in the sample and has been displaced by the water.

For convenience in calculation, the cross-section of the neck is preferably a sub-multiple of that of the container, as for example, the cross-section of the neck may be one-tenth that of the container. With that relationship, the percentage of air contained in the sample may be determined by dividing the height of the column of displaced air represented by the difference between the two water levels and measured in millimeters by the height of the sample measured in centimeters.

The container is preferably so formed that its height is several times its diameter and this is advantageous in that, with that arrangement, an error in measuring the height of the sample has less effect on the final determination of air content. Also, by making the container with its length several times its diameter, it is easier to fill the container with water in the manner described without disturbing the sample and the container has a form, which makes it easier to handle during the shaking operation and facilitates release of the air from the sample.

I claim:

1. A device for determining the air content of plastic concrete or the like which comprises a container of uniform cross section having a diameter which is only a small fraction of the height thereof and having an open top, a closure for the top of the container, the closure including a neck of uniform cross section, which is a sub-multiple of that of the container, the neck having a longitudinal opening and a scale calibrated in volumetric increments of the portion of the container of uniform cross section on its outer surface along the opening, a transparent element closing the opening, cooperating means on the container and closure for detachably securing the closure to the container, and a removable cap for the upper end of the neck.

2. A device as set forth in claim 1 in which the transparent element is a liner tube for the neck and is sealed with respect to the neck at each end.

References Cited in the file of this patent

UNITED STATES PATENTS

| 1,377,577 | Hanson | May 10, 1921 |
| 2,056,196 | Knappen | Oct. 6, 1936 |
| 2,280,617 | Bell | Apr. 21, 1942 |
| 2,635,459 | Gray | Apr. 21, 1953 |

OTHER REFERENCES

American Concrete Institute Journal, vol. 18, No. 9, May 1947, pp. 1053–1072.